(12) United States Patent
Bunker

(10) Patent No.: US 6,305,510 B1
(45) Date of Patent: Oct. 23, 2001

(54) DISC BRAKE SYSTEM

(75) Inventor: Kenneth James Bunker, Rearsby (GB)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/319,827

(22) PCT Filed: Dec. 8, 1997

(86) PCT No.: PCT/GB97/03386

§ 371 Date: Jun. 11, 1999

§ 102(e) Date: Jun. 11, 1999

(87) PCT Pub. No.: WO98/26192

PCT Pub. Date: Jun. 18, 1998

(30) Foreign Application Priority Data

Dec. 12, 1996 (GB) ................................................. 9625854
Dec. 12, 1996 (GB) ................................................. 9625861

(51) Int. Cl.[7] .................................................. F16D 65/10
(52) U.S. Cl. .................................. 188/218 XL; 188/73.2; 188/73.38
(58) Field of Search ................................ 192/205, 210.1, 192/200, 88 B, 70.19, 70.2; 188/218 XL, 73.2, 264 AA, 73.1, 73.36, 73.37, 73.38

(56) References Cited

U.S. PATENT DOCUMENTS

| | | | |
|---|---|---|---|
| 1,933,176 | 10/1933 | Jonsson | 188/72 |
| 1,959,213 | * 5/1934 | Nygard | 192/68 |
| 2,724,252 | * 11/1955 | Schmal | 64/27 |
| 2,737,033 | * 3/1956 | Bendall | 64/14 |
| 2,764,261 | 9/1956 | Bridges | 188/72 |
| 2,926,760 | * 3/1960 | Lucien | 188/218 |
| 3,171,515 | 3/1965 | Wolfe | 188/171 |
| 3,191,735 | * 6/1965 | Wavak | 192/110 |
| 3,233,704 | 2/1966 | Strain et al. | 188/71 |

(List continued on next page.)

FOREIGN PATENT DOCUMENTS

| | | | |
|---|---|---|---|
| 2 039 003 | 2/1971 | (DE) . | |
| 2039003 | 2/1971 | (DE) . | |
| 2 451 104 | 5/1976 | (DE) . | |
| 96553 | 12/1983 | (EP) | F16D/65/12 |
| 983548 | 2/1965 | (GB) . | |
| 1350350 | 4/1974 | (GB) | F16D/55/36 |
| 2015122 | 9/1979 | (GB) | F16D/65/12 |
| 2 150 263 | 6/1985 | (GB) . | |
| 2184801 | 7/1987 | (GB) | F16D/65/12 |
| WO 94/02753 | 2/1994 | (WO) | F16D/65/12 |
| WO 94/02753 | 3/1994 | (WO) . | |
| 70/5340 | 8/1970 | (ZA) . | |
| 70/5340-A1 | * 8/1970 | (ZA) . | |

*Primary Examiner*—Robert J. Oberleitner
*Assistant Examiner*—Benjamin A. Pezzlo
(74) *Attorney, Agent, or Firm*—Synnestvedt & Lechner LLP

(57) ABSTRACT

A disc brake system comprises a hub and a disc. The hub is mounted for rotation about a central rotational axis and the disc is mounted on the hub to rotate therewith. The disc is slidable on the hub in a direction which is parallel to said central rotational axis. The system also comprises a plurality of leaf springs which are mounted between the hub and the disc, the leaf springs acting to apply radially-directed forces to the disc. The leaf springs are arranged so that they extend tangentially of the hub when the disc is not mounted on the hub but are deformed by the presence of the disc.

8 Claims, 4 Drawing Sheets

U.S. PATENT DOCUMENTS

| | | | |
|---|---|---|---|
| 3,438,464 | | 4/1969 | Barrington ............................ 188/72 |
| 3,630,320 | | 12/1971 | Lochmann ......................... 188/18 A |
| 3,631,953 | | 1/1972 | Snoy et al. ......................... 192/70.17 |
| 3,642,101 | * | 2/1972 | Hauth ................................. 188/73.3 |
| 3,692,148 | | 9/1972 | Hauth ................................. 188/18 A |
| 3,754,624 | | 8/1973 | Eldred ................................. 188/71.5 |
| 3,788,436 | * | 1/1974 | Sugahara ............................ 192/88 B |
| 3,829,260 | * | 8/1974 | Shimoda ............................. 418/178 |
| 3,915,272 | * | 10/1975 | Maurice ............................. 192/70.2 |
| 3,934,686 | * | 1/1976 | Stimson et al. .................. 188/251 A |
| 4,000,791 | | 1/1977 | Kovac ................................ 188/71.5 |
| 4,058,190 | | 11/1977 | Gardner et al. ............... 188/218 XL |
| 4,256,209 | | 3/1981 | Lupertz ......................... 188/218 XL |
| 4,280,597 | * | 7/1981 | Schorwerth .................... 188/218 XL |
| 4,296,851 | * | 10/1981 | Pierce ................................ 192/84 C |
| 4,478,324 | | 10/1984 | Sink ................................. 192/70.17 |
| 4,479,569 | | 10/1984 | Kummer et al. ................... 192/70.2 |
| 4,511,021 | | 4/1985 | Grider ........................... 188/218 XL |
| 4,534,457 | | 8/1985 | Eltze et al. .......................... 192/70.2 |
| 4,557,356 | * | 12/1985 | Petersen ........................ 188/218 XL |
| 4,576,255 | | 3/1986 | Méry et al. .......................... 188/71.5 |
| 4,585,096 | | 4/1986 | Bok ................................... 188/73.37 |
| 4,798,268 | * | 1/1989 | Fargier et al. ...................... 188/71.5 |
| 4,844,206 | | 7/1989 | Casey ................................ 188/18 A |
| 4,865,160 | | 9/1989 | Casey ................................ 188/18 A |
| 5,137,374 | * | 8/1992 | Orkin ................................. 384/298 |
| 5,310,025 | | 5/1994 | Anderson .......................... 188/73.37 |
| 5,383,538 | | 1/1995 | Bair et al. ........................ 188/218 R |
| 5,390,769 | | 2/1995 | Bair et al. ........................ 188/218 R |
| 5,437,351 | | 8/1995 | Lindner ............................. 188/18 A |
| 5,520,269 | * | 5/1996 | Yamamoto et al. ........... 188/218 XL |
| 5,851,056 | * | 12/1998 | Hyde ................................. 301/6.91 |
| 6,035,978 | * | 3/2000 | Metzen et al. ................. 188/218 XL |

* cited by examiner

DISC BRAKE SYSTEM

This invention is concerned with a disc brake system, for example for a wheel of a vehicle.

A conventional disc brake system of a vehicle comprises a hub mounted on a suspension link for rotation relative thereto about a central rotational axis. The hub provides a mounting for the wheel. The system also comprises a brake disc mounted on the hub to rotate therewith, friction material pads arranged on opposite sides of the disc, and at least one piston and cylinder assembly operable to urge the pads into engagement with the disc, to brake the hub and hence the wheel. Conventionally, the piston and cylinder assembly is slidably mounted on a slide bolted to the suspension link of the vehicle. The disc is conventionally rigidly fixed to the hub, and wear of the pads and/or the disc is accommodated by the sliding movement of the cylinder.

Disc brake systems which have discs which are non-rotational relative to the hub but slidable on the hub by means of splines or other non-circularity of the hub and the disc are also known, see, for example, GB 1 396 503. However, such systems are associated with technical problems. For example, since the discs are relatively thin, they tend to tilt on the hub and affect the braking ability. Also, there is a tendency for noise to be produced by rattle of the disc against the hub. At higher disc temperatures, these problems can be particularly severe since, when there is a large temperature differential, such as 600° C., between the braking surface of the disc and the hub, the disc expands considerably, away from the hub, exacerbating the problems of tilting and rattle.

The present invention addresses these technical problems.

According to the present invention, there is provided a disc brake system comprising a hub, and a disc, the hub being mounted for rotation about a central rotational axis and the disc being mounted on the hub to rotate therewith, wherein the disc is slidable on the hub in a direction which is parallel to said central rotational axis, characterised in that the system also comprises a plurality of resilient force applicators which are mounted between the hub and the disc, the force applicators acting to apply radially-directed forces to the disc, the force applicators being distributed circumferentially around the hub.

In a disc brake system according to the invention, the forces applied by the resilient force applicators serve to reduce noise from rattle of the disc against the hub, to control the sliding movement of the disc on the hub, to control the concentricity of the disc with the hub, and to provide stability of the disc to avoid tipping. In order to reduce disc wear, a disc brake system according to the invention may have two or more discs mounted side-by-side on the same hub, the resilient force applicators acting on all the discs.

Preferably, in order to achieve improved concentricity of the disc on the hub, the resilient force applicators are substantially equispaced about the central rotational axis. There may be at least three equally-spaced resilient force applicators.

Preferably, the force applicators are leaf springs. Each leaf spring may be secured to the outer surface of the hub in a manner such that the spring extends tangentially of the hub when the disc is not mounted on the hub.

In one possibility, the hub and the disc have intermeshing surface features which prevent relative rotational movement between the hub and the disc but allow relative movement parallel to the central rotational axis, there being spaces between said intermeshing surface features in which said force applicators are mounted. Said intermeshing surface features may comprise axially-extending splines on the external surface of the hub and teeth projecting from the internal surface of the disc.

In another possibility which reduces wear problems where the hub and the disc engage one another and difficulties in manufacturing intermeshing surface features, the internal surface of the disc and the external surface of the hub are formed with recesses in which a plurality of axially-extending rollers are captive, the rollers serving to transmit rotational drive between the hub and the disc, the disc being slidable axially on the rollers and hence relative to the hub. It is known from GB 983 548 to transmit driving force between the hub and the disc by means of axially-extending rollers which are captive between the hub and the disc. In this case, the leaf springs may be positioned between the rollers around the hub. Alternatively, at least some of the leaf springs may have an opening therein in which one of the rollers is received. Preferably, in order to reduce corrosion problems, the rollers have surfaces formed from a material of higher corrosion-resistance than steel, eg. nickel-chrome.

There now follow detailed descriptions, to be read with reference to the accompanying drawings, of three disc brake systems which are illustrative of the present invention.

Figure 1:
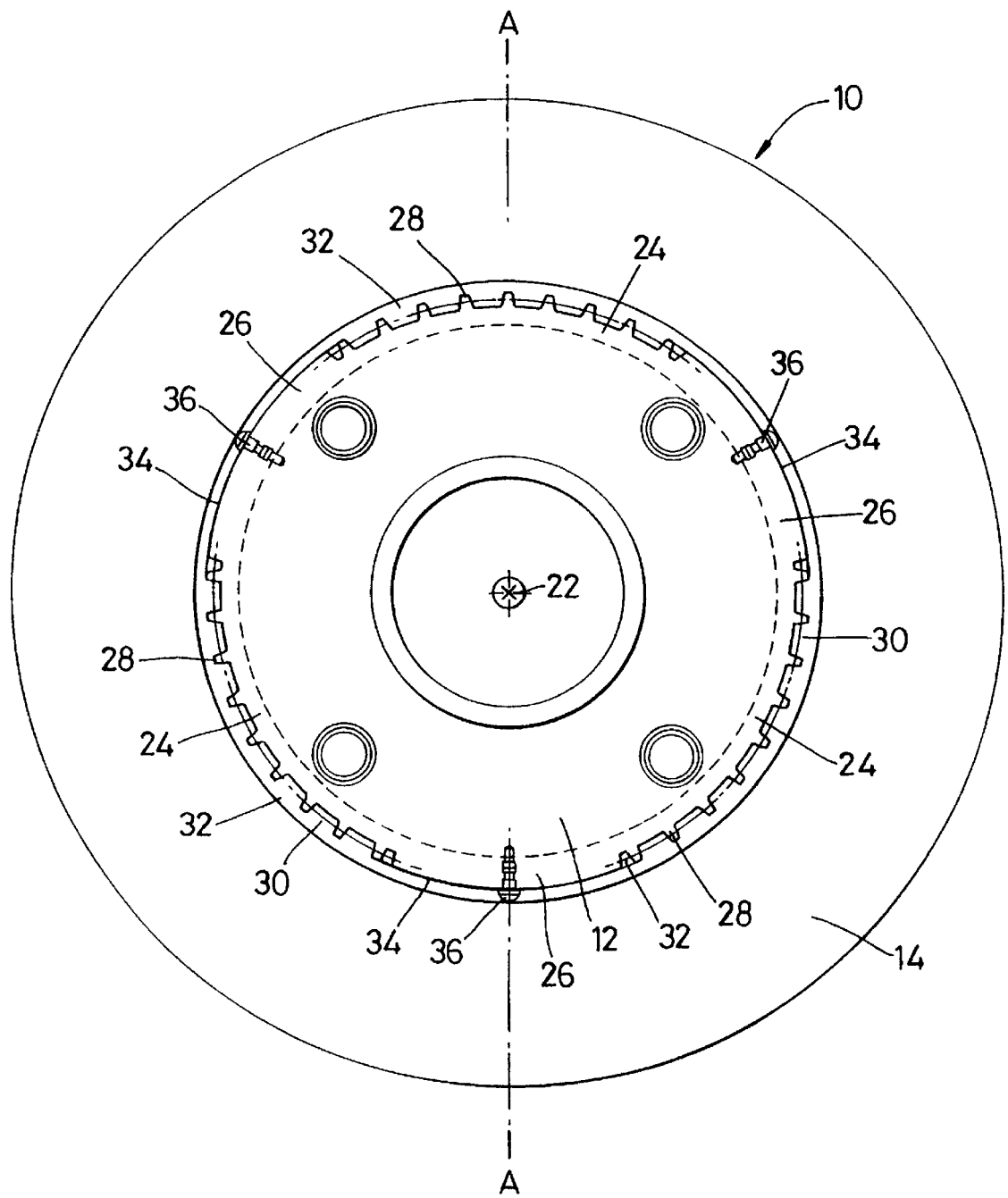
FIG. 1 is a front elevation of the first illustrative system.
Figure 2:
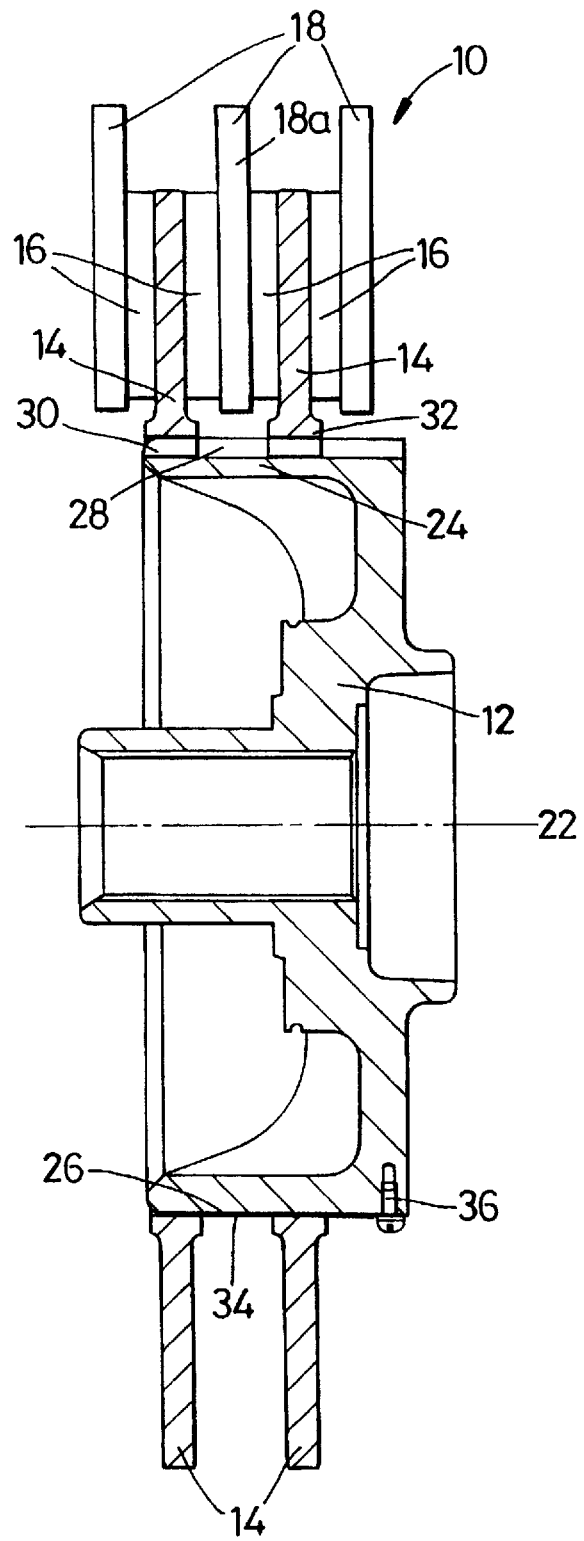
FIG. 2 is a cross-section of the first illustrative system taken on the broken line A—A in FIG. 1.

The first illustrative disc brake system 10 shown in FIGS. 1 and 2 is for a wheel of a car. The system 10 comprises a hub 12, on which the wheel can be mounted, and two annular brake discs 14. The hub 12 is mounted for rotation about a central rotational axis 22 and the discs 14 are mounted parallel to one another on the hub 12 to rotate therewith. The discs 14 are, however, slidable on the hub 12 in a direction which is parallel to the axis 22. The system 10 also comprises four friction pads 16 (FIG. 2) for braking the discs 14 by engaging side surfaces of the discs. The friction pads 16 are secured to three backing plates 18, one backing plate 18a being between the discs 14 and the others being on opposite sides of the discs 14 to the plate 18a. The median plate 18a has friction pads 16 secured to both of its faces. The brake pads 16 and the backing plates 18 are not shown in FIG. 1.

In order to prevent relative rotational movement between the hub 12 and the discs 14 but allow relative movement parallel to the central rotational axis 22, the hub and the discs have intermeshing surface features. Specifically, the hub 12 has axially-extending splines 28 formed on its external surface on which the discs 14 are mounted. The splines 28 are arranged in groups so that three 75° arcs 24 of the outer surface of the hub 12 have the splines 28, the arcs 24 being separated by three 45° arcs 26 which are free of splines and are spaced from the discs 14. The splines 28 engage inwardly-projecting teeth on corresponding arcs 32 of the internal surfaces of the discs 14, in sliding axial engagement.

The system 10 also comprises a plurality of resilient force applicators which are mounted between the hub 12 and the discs 14. These force applicators are provided by three leaf springs 34 distributed circumferentially around the hub 12. One of the leaf springs 34 is secured to each of the splineless arcs 26 of the hub 12. The leaf springs 34 are, thus, equispaced about the central rotational axis 22. Each leaf spring 34 is secured in the circumferential centre of the portion 26 of the outer surface of the hub 12 to which it is secured, so that the spring 34 extends tangentially of the hub 12 when the disc 14 is not mounted on the hub 12. However, the springs 34 are deformed by the presence of the discs 14 so that each press resiliently on the on the discs 14 at the circumferential ends of the springs 34. The leaf springs 34 are generally rectangular pieces of spring steel, and are 0.25–0.3 mm thick. The leaf springs 34 are each secured to the hub 12 by a central screw 36. In alternative embodiments, there may be more than three leaf springs 34. The springs 34 act to apply radially-directed forces to the discs 14.

In alternative embodiments, the leaf springs 34 have a projection which is clipped into a socket in the hub 12 in order to secure the springs to the hub.

When the disc brake system 10 is mounted in a vehicle, one of the two outer backing plates 18 is fixedly mounted, the other outer backing plate 18 and the median backing plate 18a are mounted to slide in a direction which is parallel to the axis 22. In order to brake the vehicle, the movable outer backing plate 18 is moved towards the discs 14 so that its pad 16 presses on the adjacent disc 14. This causes the disc 14 to slide on the hub 12 so that the disc presses on one of the pads 16 of the median backing plate 18a . This causes the median backing plate 18a to slide on the hub 12 so that its other pad 16 presses on the other disc 14. This causes the other disc 14 to slide on the hub 12 until it presses against the pad 16 of the fixed backing plate 18. Frictional forces between the pads 16 and the discs 14 then brake the hub 12 and hence the wheel attached thereto. During the sliding movement of the discs 14, the forces applied by the leaf springs 34 control the movement, maintain the disc concentric relative to the axis 22, prevent tilting, and prevent rattling.

Figure 3:
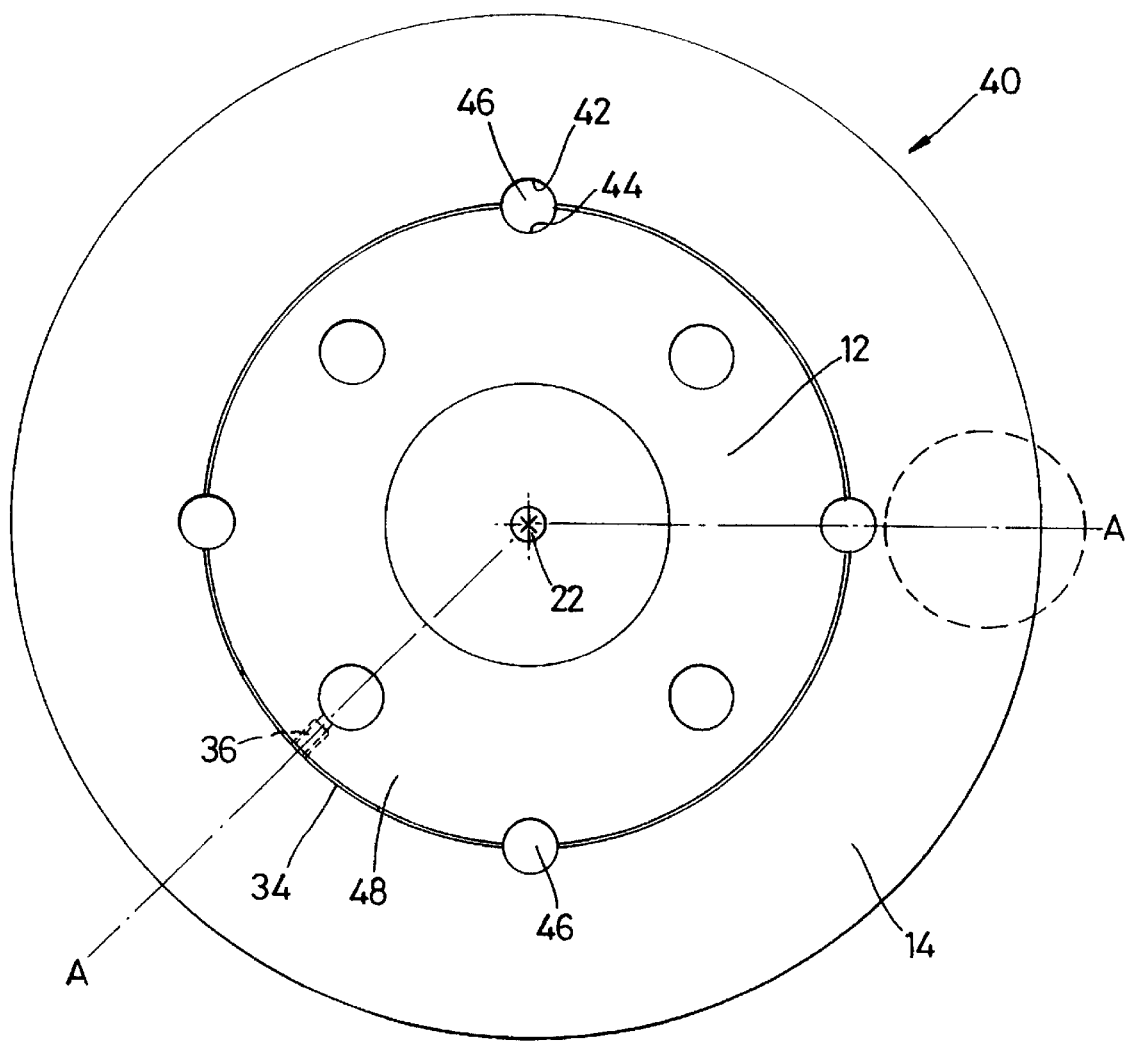
FIG. 3 is a front elevation of the second illustrative system.
Figure 4:
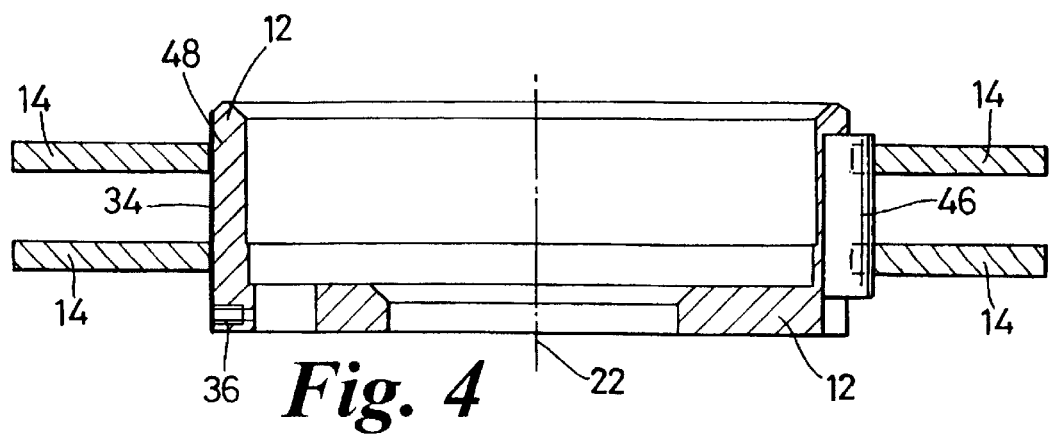
FIG. 4 is a cross-section of the system of the second illustrative system taken on the broken line A—A in FIG. 3.

The second illustrative disc brake system 40 shown in FIGS. 3 and 4 is generally similar to the system 10 except as hereinafter described and the same reference numerals are used for similar parts. The system 40 comprises a hub 12, and two brake discs 14. The hub 12 is mounted for rotation about a central rotational axis 22 and the discs 14 are mounted parallel to one another on the hub 12 to rotate therewith. The discs 14 are, however, slidable on the hub 12 in a direction which is parallel to the axis 22.

The system 40 differs from the system 10 in the design of its hub 12, in the form of the connection between its hub 12 and its discs 14, and in having four force applicators in the form of leaf springs 34 mounted on the hub 12 by screws 36, instead of three. Specifically, the splines 28 and teeth 30 of the system 10 are not present. Instead, the internal surface of each disc 14 is formed with four concave recesses 42 therein which are equispaced about the axis 22, the recesses 42 being generally semi-circular in transverse cross-section, and the external surface of the hub 12 is formed with four corresponding concave recesses 44 which are arranged so that each recess 44 can co-operate with one of the recesses 42 in forming a cylindrical space.

The system 40 also comprises four axially-extending cylindrical rollers 46 made of nickel-chrome. The rollers 46 are captive between the discs 14 and the hub 12. Each roller 46 is received in the cylindrical spaces formed by one of the recesses 44 of the hub 12 and by two of the recesses 42, one in each disc 14. The rollers 46 are, thus, equispaced about the central rotational axis 22. The discs 14 are in axial sliding engagement with the rollers 46 and can slide axially relative to the hub 12. The rollers 46 transmit rotational drive between the hub 12 and the discs 14.

The four leaf springs 34 of the system 40 are secured by the screws 36 to the circumferential centres of portions 48 of the external surface of the hub 12 which are between the rollers 46. Each spring 34 extends tangentially of the hub 12 when the discs 14 are not mounted on the hub 12 but are bent when the discs 14 are mounted on the hub 12 so that they act to apply radially-directed forces to the discs 14. Only one of the leaf springs 34 is shown in FIGS. 3 and 4.

Figure 5:
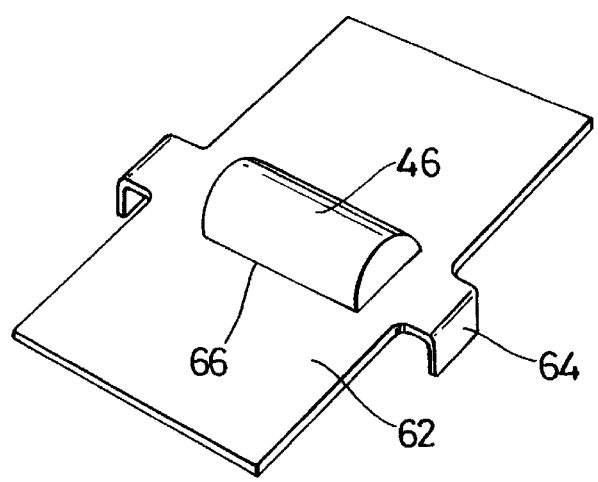
FIG. 5 is a perspective view of a roller and a leaf spring which form a part of the third illustrative system.
Figure 6:
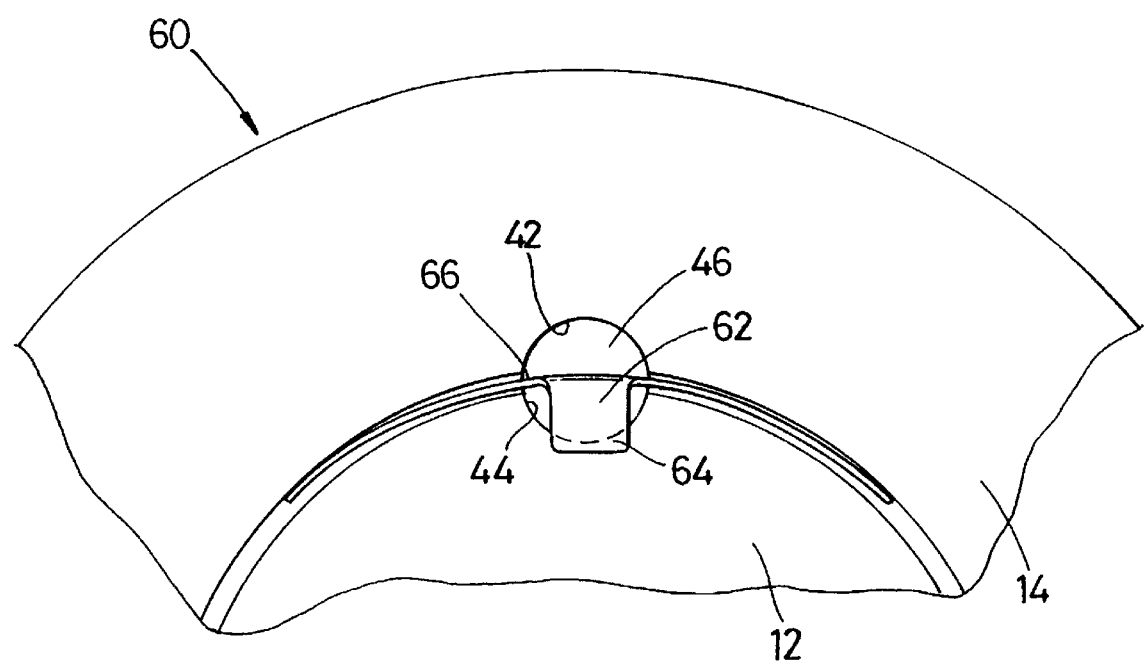
FIG. 6 is a front elevation of part of the third illustrative system showing the roller and spring shown in FIG. 5.

The third illustrative disc brake system 60, illustrated by FIGS. 5 and 6 is similar to the system 40 except as described below and like reference numerals are used for like parts. The system 60 comprises a hub 12 and two discs 14 (only one disc 14 is shown). The hub 12 and the discs 14 have recesses 42 and 44, respectively, in which rollers 46 are received. The system 60 differs from the system 40, however, in that its force applicators are provided by four leaf springs 62 of different design to the springs 34 and positioned differently.

Each of the leaf springs 62 is made from sheet spring steel which is 0.25–0.3 mm thick and is generally rectangular except for tabs 64 which are bent over the ends of the hub 12 to secure the spring 62 to the hub. Each spring 62 is positioned over one of the rollers 46 with the roller 46 received in an opening 66 through the spring 62.

What is claimed is:

1. A disc brake system comprising a hub, and a disc, the hub being mounted for rotation about a central rotational axis and the disc being mounted on the hub to rotate therewith, the hub having circumferentially extending curved support surfaces each having a radius of curvature originating at the central rotational axis, the disc being slidable on the hub in a direction which is parallel to said central rotational axis, wherein the system also comprises a plurality of leaf springs distributed circumferentially around the hub, the leaf springs being secured to the curved support surface of the hub and acting to apply radially-directed forces to the disc, the springs having end portions extending tangentially away from the curved support surfaces of the hub when the disc is not mounted on the hub but are deformed to an arcuate profile between the disc and the hub by the presence of the disc.

2. A disc brake system according to claim 1, wherein the leaf springs are substantially equispaced about said central rotational axis.

3. A disc brake system according to claim 1, wherein the hub and the disc have intermeshing surface features which prevent relative rotational movement between the hub and the disc but allow relative movement parallel to the central rotational axis, there being spaces between said intermeshing surface features in which said leaf springs are mounted.

4. A disc brake system according to claim 3, wherein said intermeshing surface features comprise axially-extending splines on the external surface of the hub and teeth projecting from the internal surface of the disc.

5. A disc brake system according to claim 1, wherein the internal surface of the disc and the external surface of the hub are formed with pairs of interfacing arcuate recesses, axially-extending rollers captured in the recesses, the rollers serving to transmit rotational drive between the hub and the disc, the disc being slidable axially on the rollers and hence relative to the hub.

6. A disc brake system according to claim 5, wherein the leaf springs are positioned between the rollers around the hub.

7. A disc brake system according to claim 5, wherein at least some of the leaf springs have an opening therein in which one of the rollers is received.

8. A disc brake system according to claim 2, wherein the leaf springs are secured at the midpoint thereof to the curved support surface of the hub.

* * * * *